Jan. 7, 1969  J. M. ERICKSON ET AL  3,421,085
CIRCUIT FOR SURGE CURRENT TESTING OF SILICON
CONTROLLED RECTIFIERS
Filed June 16, 1966  Sheet 1 of 4

INVENTORS.
JOHN M. ERICKSON
JOHN FAIRWEATHER
BY Ernest J. Weinberger
Louis B. Applebaum
ATTORNEYS INVENTORS.
JOHN M. ERICKSON
JOHN FAIRWEATHER
BY Ernest J Weinberger
Louis B. Appleton
ATTORNEYS INVENTORS.
JOHN M. ERICKSON
JOHN FAIRWEATHER
BY Ernest J Weinberger
Louis B. Appleton
ATTORNEYS

United States Patent Office 3,421,085
Patented Jan. 7, 1969

3,421,085
CIRCUIT FOR SURGE CURRENT TESTING OF SILICON CONTROLLED RECTIFIERS
John M. Erickson, Garden City, and John Fairweather, Uniondale, N.Y., assignors to the United States of America as represented by the Secretary of the Navy
Filed June 16, 1966, Ser. No. 559,054
U.S. Cl. 324—158          4 Claims
Int. Cl. G01r 11/00

ABSTRACT OF THE DISCLOSURE

A circuit for generating and applying to a silicon controlled rectifier (SCR) a non-recurrent surge current and non-repetitive peak reverse voltage. The circuit includes gated SCR's and transformers for providing the timing and phase relationships required.

---

The invention described herein may be manufactured and used by or for the Government of the United States of America for governmental purposes without the payment of any royalties thereon or therefor.

This invention relates to the testing and evaluation of unidirectional conducting semi-conductors and more particularly to the measurement and application of non-repetitive forward surge currents to diodes and silicon controlled rectifiers (SCR) in order to ascertain the degrading of their operating characteristics resulting therefrom.

An SCR is a solid state switching element having a cathode, anode and a control or gate element. In most respects it is similar to a thyratron or an ignitron. Considerable information is available in the literature which fully describes in detail all forms of SCR's.

One operating condition to which SCR's may be subjected in operation is the sudden, non-repetitive large rise in the forward current passing therethrough. This non-recurrent forward surge current produces both an electrical and mechanical effect on the SCR in addition to affecting the life thereof. There are two types of ratings applied to SCR, both relating to the current rating. Where the current passing through the SCR does not cause an increase in the peak junction temperature above the allowable maximum at any time, is known as a recurrent current. On the other hand where the allowable maximum temperature is exceeded for a brief instant, the current causing such excess is referred to as non-recurrent. SCR's are rated both as to recurrent and non-recurrent conditions and it is its non-recurrent rating that classes it as a power semiconductor. This in effect allows the SCR to be subjected to a brief instantaneous forward current overload whose amount or amplitude has been set forth by the manufacturer. Of course these overloads are rated under certain conditions one of which is that they will not occur more than a prescribed number of times during the operating life of the SCR. For the ordinary typical SCR this is anywhere from one hundred to several hundred, it being understood that operation in excess thereof may result in a permanent loss in desired characteristics.

In general a non-recurrent forward surge current is an overload current that can cause the rated (recurrent) junction temperature of the SCR to be exceeded for a brief instant. It is this surge current to which the device is subjected when an abnormal condition such as a short circuit or failure of an equipment component occurs. Repeated surge currents can cause thermal fatigue within the SCR which condition is generally indicated by an increase in the thermal resistance between the junction itself and the SCR case. Additionally, these surge currents can cause localized melting of the silicon or the adjoining alloys with consequent progressive damage for repeated current surges.

It has been found that although surface failures are the result of chemical activation of sealed-in contaminants or by an imperfect seal, the failure may be accelerated by both surge currents and overvoltage. Reduction of the SCR forward and reverse blocking capabilities are the first indications that some rating thereof is being overstressed as by current surges or high voltage transients.

In view of the foregoing it is an object of this invention to provide a simple direct, reliable and relatively inexpensive circuit for the application of a non-recurrent surge current to an SCR.

Another object of this invention is to provide an apparatus and method for applying high non-recurrent forward surge currents and non-repetitive peak reverse voltages to SCR's under test thereby accelerating the life of the same.

Other objects and advantages will appear from the following description of an example of the invention, and the novel features will be particularly pointed out in the appended claims.

Figure 1:
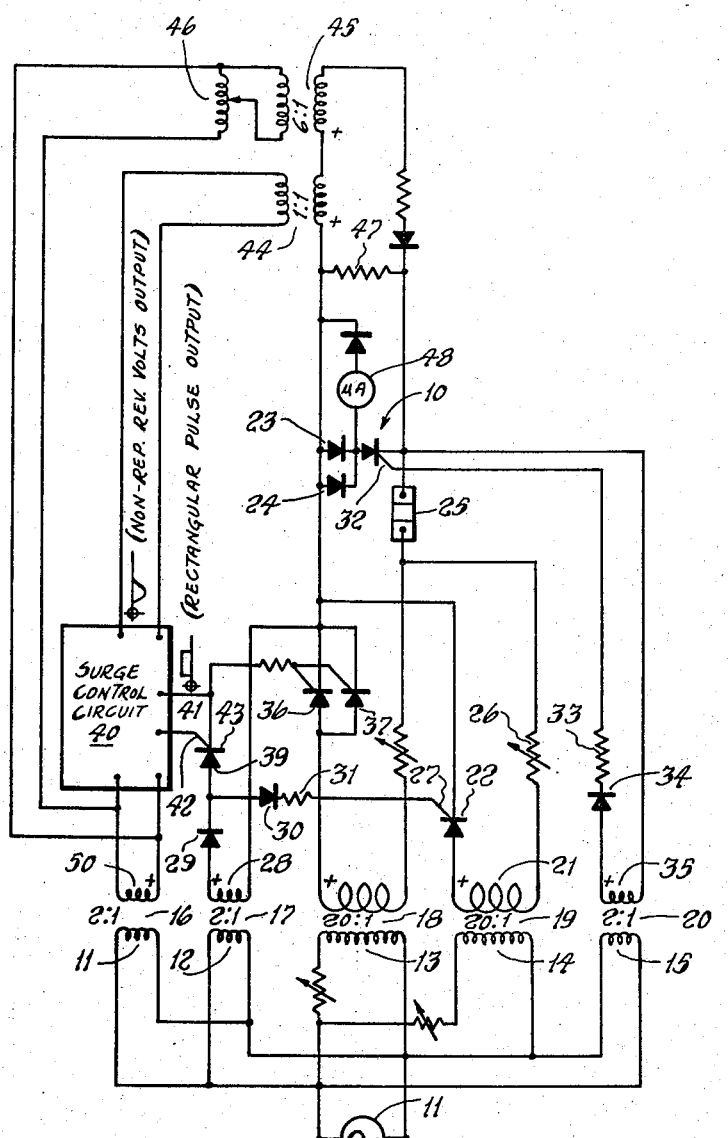
FIG. 1 is a schematic wiring diagram of an embodiment made in accordance with the principles of this invention.

The circuit embodiment illustrated in FIG. 1 applies rated non-recurrent surge currents and rated non-repetitive peak reverse voltages to the SCR 10 (test unit). The surge current and reverse voltage are specified by the manufacturer who also specifies that these may be applied for one hundred to several hundred times in the operating life of the SCR without permanent impairment to the characteristics of the test unit. It has been found that when the surge currents are applied at 15 second intervals this "off" time is adequate to keep the rise in case temperature to within several degrees C. during a group of half cycle surge currents. Measurements are generally made of the gate firing and anode-cathode leakage characteristics before and after every 200 to 300 applications of surge current. The reverse leakage current of the SCR is monitored during the surge current operation for an indication of the effects of successive surges on the reverse blocking parameter. The aforementioned measurements are made with instruments not shown herein and the illustrated circuit is confined to providing and applying the non-recurrent surge currents.

An alternating current source 11 is connected to the primaries 11–15 of transformers 16 to 20. The secondary 21 of step-down transformer 19 is in series with SCR 22, parallel diodes 23 and 24, the SCR 10 under test, shunt (non-inductive) 25, and adjustable resistor 26. The secondaries are wound as indicated by their polarity. The gate 27 of SCR 22 is connected to one side of secondary 28 via diode 29 and 30 and limiting resistor 31. The gate 32 of the test SCR 10 is connected in series with limiting resistor 33, diode 34 the secondary 35 of transformer 20 and the cathode 36. With this circuit arrangement both SCR 22 and test SCR 10 are fired or gated on simultaneously every positive half cycle with the forward rated current being delivered by transformer 19 to the test SCR.

Low voltage step-down transformer 18 is employed to supply the surge current which is super-imposed on the rated forward current for one or more half cycles. It should be noted that since transformers 17 and 18 are in phase the firing of parallel SCR's 37 and 38 by secondary 28 via SCR 39, which firing is controlled by surge control circuit 40, will permit the surge current to be applied at the correct instant to be superimposed but whose repetition is subject to the control circuit 40.

The control circuit provides a rectangular wave voltage output at terminals 41 which are connected to the gate 42 and cathode 43 of SCR 39. This voltage is supplied as a positive gate voltage to SCR 39 and its duration is longer than one-half a cycle so that SCR 39 is insured of firing at sometime when its anode voltage becomes positive. Clearly if the duration of the control signal were greater than one cycle then the number of cycles of surge current would depend directly thereon. In addition the control circuit 40 also supplies one-half cycle of reverse voltage via transformer 44 which is effectively superimposed on the repetitive peak reverse voltage applied from transformer 45 and adjustable autotransformer 46 to thus form the non-repetitive peak reverse voltage across test SCR 10.

Both the repetitive peak reverse voltage of transformer 45 and the combined or superimposed outputs of transformers 44 and 45 constituting the non-repetitive reverse voltage appear as a forward voltage across SCR 36 and 37 and any forward current therethrough occassioned by this reverse voltage would be most objectionable. This forward current drawn from these reverse voltage sources would in turn reduce the reverse voltage across test SCR 10 in the half-cycle preceding each half-cycle of surge current. In order to obviate such objectionable forward currents the gates of SCR 36 and 37 are biased positively only when transformer 18 is suppling a positive half cycle voltage to the anodes of these SCR's. This operation is performed through SCR 39 which fires only when its anodes and the anodes of SCR's 36 and 37 are simultaneously in the positive half-cycle. Therefore SCR 39 stands by to trigger or gate SCR 36 and 37 when the surge current transformer 18 provides a positive voltage to their anodes and blocks the positive gate to the SCR's (36 and 37) whenever the peak reverse voltage is applied to the test SCR 10.

The repetitive or non-repetitive peak reverse voltage appearing across the test SCR is actually the combined effect of transformers 18 and 19 reverse voltages and the applied peak reverse voltage (transformers 44 and 45). The reverse voltages supplied by transformers 18 and 19 appear across SCR's 36 and 37 in series with the test SCR as well as across SCR 22 in series therewith. The resistance of resistor 47 which is effectively in parallel with the test SCR is much lower than the reverse resistance of any of the SCR's so that the transformer 18 and 19 reverse voltages are practically all across SCR 36 and 37 and 22. Thus distortion of the applied repetitive and non-repetitive peak reverse voltages across the test SCR is minimized. The parallel diodes 23 and 24, in series are employed to divert or bypass the reverse leakage current of the test SCR to microammeter 48 for monitoring.

Figure 2:
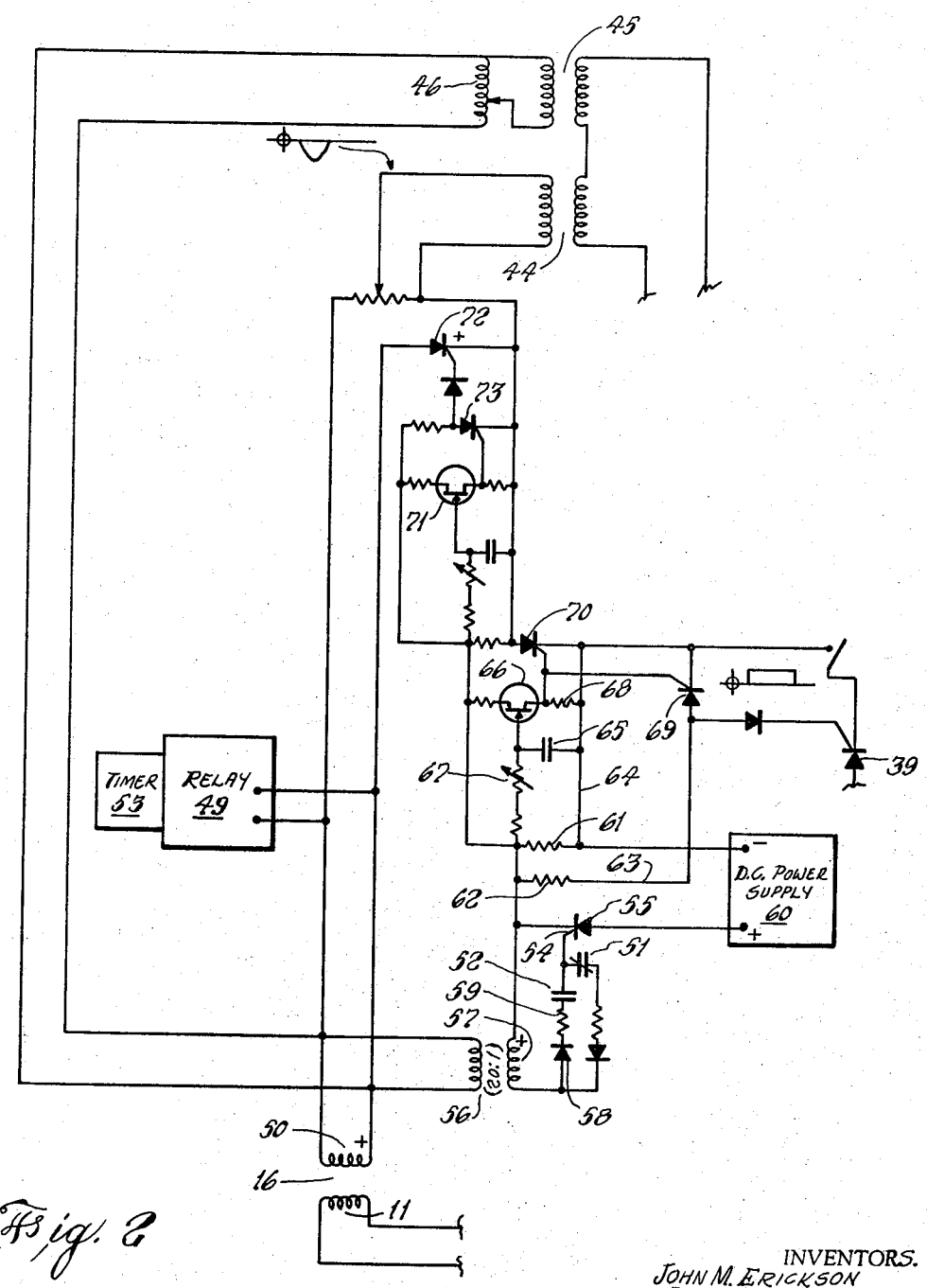
FIG. 2 is a schematic wiring diagram of the surge control circuitry illustrated in FIG. 1.

Referring now to FIG. 2 which illustrates the surge control circuit 40 of FIG. 1, the timing relay 49 is connected across the secondary 50 of transformer 16 and controls the activity of normally closed relay contacts 51 and normally open contacts 52. The relay 49 is activated by the timer 53 for a short "on" period such as 3 seconds and deenergized ("off") for a longer period say 12 seconds. With the relay energized normally closed contacts 51 are opened and contacts 52 closed so that a positive gate voltage is applied to gate 54 of gate turn off switch 55 via transformer 56, secondary 57, diode 58 resistor 59 and contacts 52 for 3 seconds out of every 15 second period. Clearly the gate is positive only for the positive half-cycles of the transformer voltage. The D.C. source 60 is connected in series with the anode and cathode of the GTO 55 and load resistor 61 so that when the GTO is fired the load resistor receives the full voltage of the source thereacross. This step type voltage is applied via resistor 62, line 63 and line 64 across the gate of SCR 39. Since transformer 16 is 180° out of phase with the transformer supplying SCR 39 its anode voltage is negative at the instant its gate is biased "on" by the voltage from source 60. This supplied voltage from source 60 remains positive into the next half cycle of the voltage across the anode-cathode so as to fire the SCR 39. At the same time the voltage across resistor 61 causes the capacitor 65 to charge until it reaches a level sufficient to fire unijunction transistor 66. Since variable resistor 67 is in series with the charging circuit, its adjustment will effectively control the time the UJT 66 is caused to fire. Upon the firing of UJT 66, capacitor 65 discharges through resistor 68, one end of which is tied to the gates of SCR 69 and 70 and triggers them.

The firing of SCR 69 substantially reduces the gate voltage on SCR 39 below its minimum firing potential and permits SCR 39 to be turned "off" when its anode voltage becomes negative. The gate voltage to SCR 39 is effectively reversed by the triggering of SCR 69 to prevent refiring of SCR 39. The voltage applied to the gate of SCR 39 is a rectangular pulse of positive voltage having a time duration between the firing of GTO 55 and the firing of UJT 66. A rectangular pulse duration of 10 milliseconds (for 60 cycle input) results in a single half cycle surge of current, since 10 milliseconds is a period longer than ½ a cycle of 60 c.p.s. A longer duration pulse can be used to obtain two or more current surges.

When SCR 70 fires, the timing cycle for UJT 71 commences and there is simultaneously a step of positive gate voltage applied to SCR 72. Since transformer 16 supplies the 60 cycle to SCR 72 the anode thereof is negative at the instant its gate is positively biased "on." This gate voltage continues into the next half cycle so as to allow SCR 72 to fire. Ten milliseconds thereafter UJT 71 fires, since it is in a circuit similar to that described for UJT 66, this likewise reduces below the minium firing voltage, the gate voltage at SCR 73. Thus the gate of SCR 72 has a rectangular pulse of positive voltage for the time interval between the firing of SCR 70 and the firing of UJT 71. Transformer 44 provides the additional reverse voltage in series and in phase with transformer 45 to supply the non-repetitive peak reverse voltage to the test SCR 10.

Figure 3:
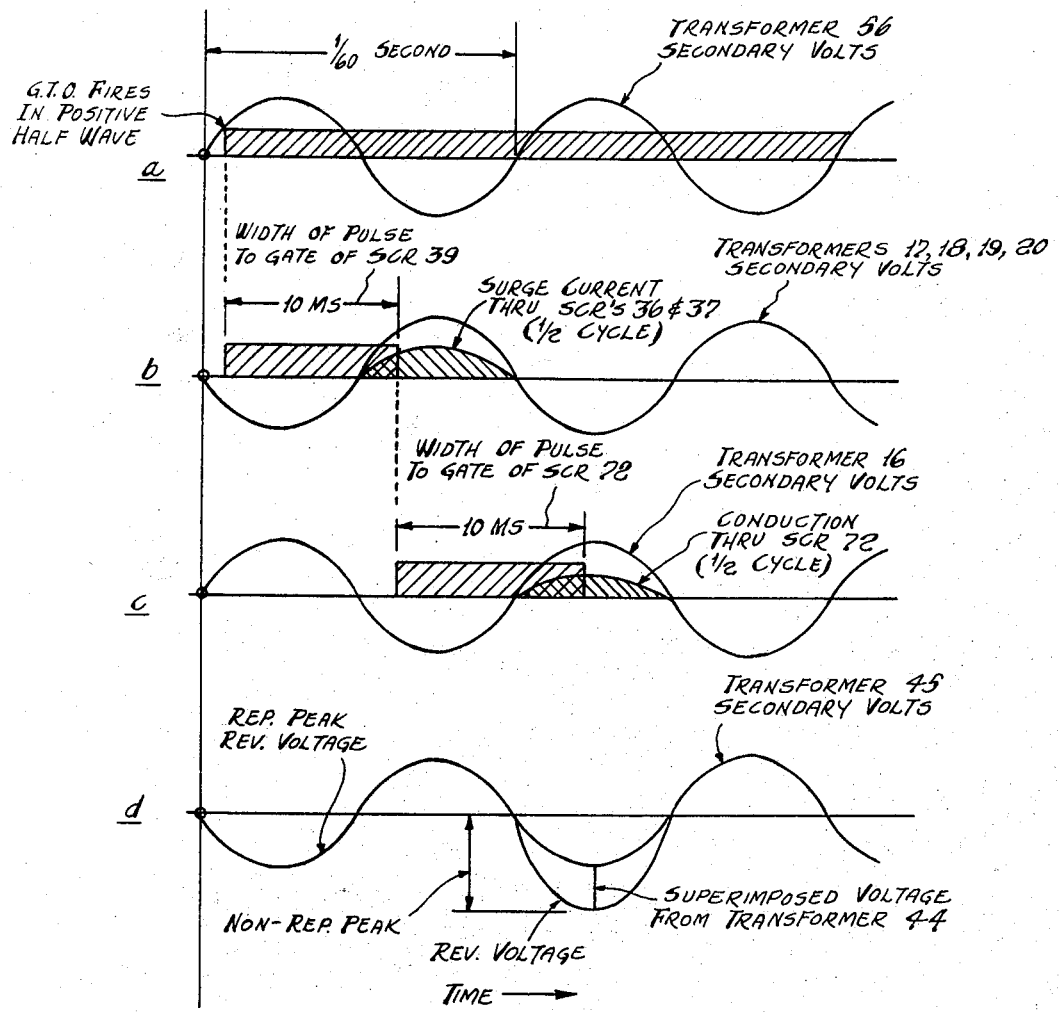
FIG. 3 illustrates graphically the phase relationships at various locations and times of the embodiment.

The phase relationships necessary for proper circuit operation are illustrated graphically by FIG. 3 wherein the first graph (a) indicates the voltage waveshape appearing at transformer 56, secondary 57 and the time at which GTO 55 fires for some point on the positive portion of the voltage waveform. As seen in (b) of this figure and comparing with (a) it is clear that the secondary voltages at transformers 17, 18, 19 and 20 are 180° out of phase with the secondary of transformer 56 and that the positive pulse at the gate of SCR 39 starts on the negative half cycle and continues into the positive half cycle to fire parallel SCR's 36 and 37 producing the surge current shown for one half-cycle. The third representation (c) shows the relative events occurring at SCR 72 and the conduction therethrough. It should be noted that the gate pulse at SCR 72 commences at the termination of gate pulse at SCR 39 so that the non-repetitive peak reverse voltage occurs during the half cycle next succeeding the non-recurrent surge current. This is clearly illustrated at (d) of FIG. 3.

Figure 4:
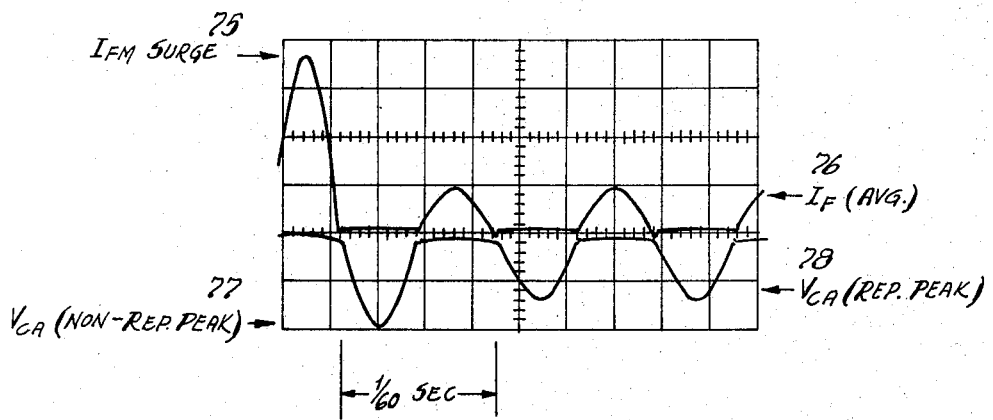
FIG. 4 is an oscillogram of the non-recurrent surge current and non-repetitive peak reverse voltage as applied to a typical SCR.

FIG. 4 illustrates simultaneously the forward non-recurrent surge current 75, the average current 76, the non-repetitive peak voltage 77 and the repetitive voltage 78. This graph was derived from the actual oscillograph of the voltages at the test SCR.

It will be understood that the various changes in the details, materials and arrangement of parts (and steps), which have been herein described and illustrated in order to explain the nature of the invention, may be made by

We claim:

1. A circuit arrangement for applying a non-recurrent surge current and non-repetitive peak reverse voltage to a silicon controlled rectifier under test which comprises:
   an input transformer having a plurality of step-down secondaries, one of said secondaries being 180° out of phase with the other of said secondaries,
   a control circuit for providing at one of its outputs a rectangular pulse of a duration longer than one half a cycle of the transformer waveshape output, and having said out of phase secondary connected to its input,
   a pair of paralleled SCR's having their electrodes respective like connected together,
   a non-inductive shunt load,
   a surge current series path including therein one of said other secondaries, said pair of SCR's cathodes and anodes, said test SCR cathode and anode, and said load,
   a third SCR,
   a pair of diodes having their like electrodes connected together,
   a forward rated current series path including therein another of said secondaries, said pair of diodes, said test SCR, said load, the anode and cathode of said third SCR,
   means connecting still another of said secondaries between the gate and cathode of said test SCR,
   a fourth SCR,
   an electrical connection between the cathodes of said pair of SCR's and said third SCR,
   a control series path having included therein yet another of said secondaries, the anode and cathode of said fourth SCR, gates of said pair of SCR's and said third SCR, said electrical connection,
   second electrical means connecting said one output of said control circuit across the gate and cathode of said fourth SCR.

2. The circuit arrangement according to claim 1 wherein said control circuit rectangular pulse output is 180° out of phase with said other secondaries.

3. The circuit arrangement according to claim 2 wherein said control circuit provides a non-repetitive half cycle voltage output.

4. The circuit arrangement according to claim 3 further including means for additively combining the potential of said non-repetitive voltage and the output of said out of phase secondary and applying the same across said test SCR.

References Cited

General Electric SCR Manual (2nd ed.), 1961, pp. 46–47.

RUDOLPH V. ROLINEC, *Primary Examiner.*

E. L. STOLARUN, *Assistant Examiner.*

U.S. Cl. X.R.

307—252